Figure 1:
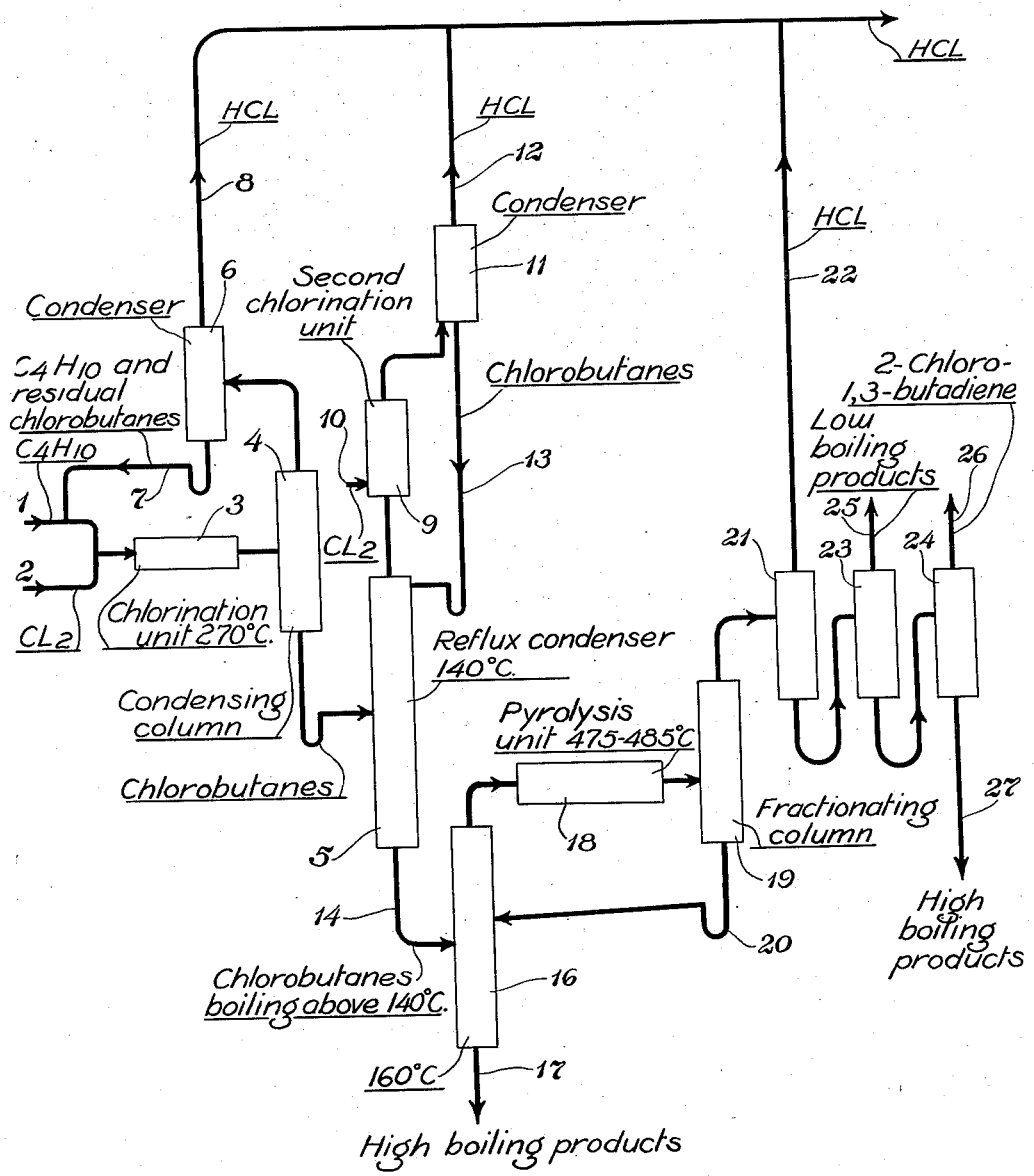

Patented Aug. 7, 1945

2,381,037

UNITED STATES PATENT OFFICE 2,381,037

PROCESS FOR THE MANUFACTURE OF CHLOROBUTADIENES FROM BUTANE

Albert S. Carter and Frank Willard Johnson, Wilmington, Del., assignors to E. I. du Pont de Nemours & Company, Wilmington, Del., a corporation of Delaware Application October 26, 1940, Serial No. 362,976

4 Claims. (Cl. 260—655)

This invention relates to an improved process for the preparation of chlorobutadienes. More particularly, it relates to the preparation of chlorobutadienes from butane by the chlorination of the latter and the subsequent elimination of hydrogen chloride by pyrolysis.

It is an object of this invention to provide a new method for the production of chlorobutadienes and especially chloro-2-butadiene-1,3. Another object is the preparation of chloro-2-butadiene-1,3 from a cheap and readily available raw material. Other objects will appear hereinafter.

These objects have been accomplished by the discovery that chlorobutadienes, and especially chloro-2-butadiene-1,3, can be prepared from the butane by chlorinating the latter and by dehydrohalogenating the chlorinated hydrocarbon. In its preferred form, the invention is carried out by chlorinating butane until the product has an average chlorine content of approximately from 56 per cent to 66 per cent chlorine. The chlorinated hydrocarbon is then submitted to pyrolysis. Moreover, the invention may be further improved by fractionating the chlorinated hydrocarbon and subjecting to pyrolysis a fraction having a boiling range of 140° C. to 160° C.

The single figure of the drawing is a flow sheet of the process carried out in a continuous manner.

In order that the process may be more fully understood, the following specific examples are given by way of illustration, but the invention is not limited thereto as will become more apparent hereinafter.

Example I

Commercially pure normal butane was chlorinated by refluxing 297 parts, by weight, of butane and (after the air had been expelled) mixing chlorine with the vapors while irradiating with a strong tungsten filament lamp. The chlorine must be introduced slowly at first and preferably through a sufficiently small orifice to cause turbulence in order to prevent firing. After 800 parts, by weight, of chlorine had been introduced (some butane was carried out with the HCl) the product in the still was found to contain 66 per cent Cl. Five hundred and twelve (512) parts of chlorinated butane were obtained.

The product just described was subjected to pyrolysis as follows: The mixture was boiled and the vapors passed through a tube whose wall-temperature was maintained at 475° C. to 485° C. From the tube, the vapors were led into a short packed column provided with a dephlegmator. Reflux was regulated so that the product was taken from the top of the column up to about 105° C. and the reflux was continuously returned to the entrance of the pyrolysis tube.

The pyrolysis products taken from the top of the column were quickly cooled and the hydrogen chloride was absorbed in water. The condensate was next submitted to a rough fractional distillation under an absolute pressure of 180 mm. The material boiling below 45° C. was collected and refractionated under a pressure of 250 mm. After taking off a small foreshot boiling up to 26° C., a fraction was collected between 26° C. to 31° C. This was identified as chloro-2-butadiene-1,3 by its boiling point, (60° C. at 760 mm.), by its refractive index, by condensation with maleic anhydride to chloro-4-tetrahydrophthalic-1,2,3,6 acid (M. P. 175° C.) and by the fact that it spontaneously polymerized on standing. This fraction contained 40 per cent Cl. Another fraction was collected from 31° C. to 36° C. at 250 mm. pressure, consisting principally of chloro-4-butadiene-1,3.

Example II

Seven hundred and forty-five (745) parts, by weight, of normal butane were cooled to −25° C. and 1160 parts, by weight, of chlorine were passed into it while maintaining the liquid at −25° C. to −20° C., and while irradiating with a tungsten filament lamp. The escaping hydrogen chloride was led through a reflux condenser maintained at −75° C., and then absorbed in water. The liquid was allowed to warm to +25° C., and 1380 parts of chlorine were passed into it at this temperature. After washing with water to remove dissolved HCl, and drying, the product was found to contain 66.5 per cent Cl.

This product was submitted to pyrolysis and fractional distillation in the same manner as described in Example I.

Example III

A mixture of 4 volumes of normal butane and 1 volume of chlorine was passed through a tube maintained at 270° C. The gases from the tube were led into a condenser maintained at −75° C., the uncondensed vapors were then led through a water scrubber, a drying tower packed with fused calcium chloride and finally through another −75° C. condenser. The products condensed out were fractionally distilled through a short distilling column to separate the unchlorinated butane. The residue boiling above 50° C., at 760 mm. pressure was then further chlorinated by boiling and passing the vapors through a tube maintained at 270° C., where it was mixed with chlorine gas, condensed in a water-cooled condenser and returned to the boil-up pot for further circulation. When an analysis showed that the liquid in the boil-up pot contained 65.6 per cent Cl, the product was submitted to pyrolysis and fractional distillation as described in Example I.

*Example IV*

A typical continuous process is illustrated in the figure of the drawing which will now be described. Gaseous butane and chlorine are introduced in essentially equivalent amounts at 1 and 2 respectively, passing into the chlorination tube 3 which may be maintanied at approximately 270° C. The effluent gases enter column 4 in which the chlorobutanes are condensed. The chorobutanes, condensed in column 4, pass from the bottom of said column into column 5. The gases leaving the top of the condensing column 4 pass into condenser 6 wherein butane and residual chlorobutanes are condensed and returned to 1 as shown at 7. HCl gas leaves condenser 6 at 8. The condenser 6 may be a refrigerated column or it may be a scrubbing system for butane recovery. The chlorinated material introduced into column 5 is heated to reflux temperature and the vapors issuing therefrom pass to second chlorinator 9 into which chlorine is introduced at 10. Chlorination in this second chlorinator may be accomplished thermally or it may be carried out by irradiation with actinic light. The gases from 9 pass into condenser 11 from which HCl is vented at 12 and the chlorobutanes are returned to reflux condenser 5 at 13. The condenser 11 may consist of a refrigerated condenser or column or it may be an absorption unit, or it may consist of a unit combining refrigeration and absorption. Chlorobutanes having a higher boiling point than 140° C. leave reflux condenser 5 at 14 as liquids and enter column 16 which is heated to about 160° C. Materials having a boiling point above about 160° C. are discarded at 17 while those having a boiling point lower than this temperature pass from the top of 16 through pyrolysis unit 18 which is held at 475° C. to 485° C. The pyrolysis gases are fractionated in column 19, the higher boiling di- and tri-chlorobutanes returning to column 16 via 20 while HCl and chlorobutadiene pass off as vapors to column 21. HCl is vented from column 21 at 22 and chlorobutadiene, as a liquid, is passed to rectifying columns 23 and 24 successively. Low boiling products leave column 23 at 25; chloro-2-butadiene-1,3 leaves column 24 at 26, and higher boiling products leave 24 at 27.

The chlorination of butane may be carried out in a number of ways. Liquid normal butane, or a mixture containing normal butane may be refluxed and chlorine may be mixed with the vapor under actinic activation until the desired average chlorine content is reached; the hydrogen chloride evolved is freed from butane and the chlorobutanes by refrigeration or by scrubbing with a suitable solvent; e. g., some of the chlorinated butanes or a high boiling hydrocarbon oil.

Another means of chlorinating the butane is to simply pass chlorine into the liquid butane or butane mixture below its boiling point until the desired average chlorine content is obtained. Actinic activation may be employed or catalysts such as active carbon, butylene, sulfur dioxide, etc., may be utilized. The hydrogen chloride that is evolved is freed from butane as described before. Super-atmospheric pressure may be used to increase the boiling point of the butane, or it may be preferred to lead butane and chlorine below the surface of previously partially chlorinated butane or other suitable solvent.

The chlorination may also be carried out by mixing the butane or butane-containing mixture with chlorine and leading the mixture through a zone of elevated temperature. In this case, the chlorine is added in steps along the path of the gases in such proportions that an explosive mixture is nowhere obtained; e. g., a mixture of 2 volumes butane and 1 volume chlorine may be led into the hot zone and at a point at which chlorination is found to be essentially complete another volume of chlorine may be added and so on until the desired chlorine content is obtained. A suitable range of temperature for this chlorination is from about 250° C. to 300° C., although temperatures above or below this range may be used. In general, the lowest practical temperature is preferred in order to avoid pyrolysis during the chlorination. In the temperature range mentioned, actinic or other activation is not required, although the reaction may be slow in starting in the absence of a catalyst.

It may be preferred to add only a part of the chlorine desired in the manner just described and to complete the chlorination at a lower temperature in order to minimize pyrolysis during the final chlorination which might lead to undesirable products. The partially chlorinated butane may be further chlorinated in the liquid phase or by mixing chlorine with the refluxing vapors as previously described.

Although it is preferred to chlorinate the butane or butane-containing mixture to an average chlorine content of 56 per cent to 66 per cent, it is possible to use mixtures containing as low an average as 40 per cent or as high as 73 per cent chlorine.

In a continuous chlorination cycle, it is advantageous to prevent loss of material as overchlorinated by-products by under-chlorinating, for example, to an average chlorine content of 60 per cent, and continuously distilling the product, recovering the dichlorobutanes which may be returned to the chlorinator, and separating the higher chlorides for subsequent dehydrohalogenation to chlorobutadienes.

Further, it has been found that a certain cut of the crude chlorinated material is particularly adapted to conversion to chloro-2-butadiene-1,3; namely, material boiling in the range of 140° C. to 160° C., and it is within the scope of the present invention to operate the process in such a manner that the crude material is fractionated, recovering low boiling dichlorobutane, separating the 140° C. to 160° C. cut for dehydrohalogenation and discarding higher boiling material. Whether an isolated fraction or the entire crude is dehydrohalogenated, the pyrolysis step, as described below, is essentially the same. The advantages of intermediate isolation of suitable chloride fractions is found in simplification of the subsequent fractionation of the final product to obtain the desired chloro-2-butadiene-1,3.

After chlorinating the butane as previously described, the crude mixture is submitted to pyrolysis. This step consists essentially in leading the vaporized material through a hot zone, quickly cooling the gases and separating the organic products from the hydrogen chloride by refrigeration or by dissolving the hydrogen chloride in water or the organic material in a high-boiling solvent, followed by fractionation.

The preferred range of temperature for the pyrolyis is from 400° C. to 500° C. although some pyrolysis will occur as low as 250° C. and at high gas velocities temperatures as high as 700° C. to 800° C. may be used. The gases from the pyrolytic zone may be submitted to any desired degree of fractionation and the high boiling material returned continuously to the boiler for further pyrolysis.

The pyrolytic zone may consist of empty tubes or may contain inert materials to aid in heat transfer or dehydrohalogenation catalysts such as magnesium salts, copper metal or copper salts, barium chloride, or supported on a suitable surface such as asbestos or unglazed clay may be used. The pyrolysis chambers themselves may be constructed of any material not too rapidly attacked by hydrogen chloride under the pyrolytic conditions, such as glass or ceramic materials, metals such as copper, iron, nickel, or alloys such as Hastelloys, though it has been observed that some metals, for example iron, promote carbon deposition during pyrolysis.

The chlorobutadienes are obtained from the crude pyrolysis product by fractional distillation. This may be carried out in one step or it may be preferred to first make a rough separation, followed by a more complete fractionation. The distillation may be carried out at atmospheric pressure, but it is preferable to distill at reduced pressures. The fractionation may be carried out continuously and form an integral part of a continuous process.

An advantage of this invention over previously known methods of obtaining the chlorobutadienes is that it permits use of an abundant, low-cost starting material and the desired products are obtained by a relatively simple, low-cost process. According to the prior art, on the other hand, it was necessary to use difficultly obtainable and expensive compounds. Another advantage is the formation of large amounts of dry, easily purified hydrogen chloride and valuable organic chlor bodies as by-products. Other advantages appear in the specification.

It is apparent that many widely different embodiments of this invention may be made without departing from the spirit and scope thereof, and, therefore, it is not intended to be limited except as indicated in the appended claims.

We claim:

1. A process for preparing monochloro-1,3-butadienes from butane, which comprises subjecting butane to direct chlorination until the chlorinated butane mixture contains from 56% to 66% chlorine, fractionating the resulting mixture of chlorobutanes, and subjecting the chlorobutane fraction boiling between 140° and 160° C. to pyrolysis at a temperature of from approximately 400° to 500° C., whereby a portion of said chlorobutane fraction is converted to monochloro-1,3-butadienes.

2. A process for preparing monochloro-1,3-butadienes from butane, which comprises subjecting butane to direct chlorination until the chlorinated butane mixture contains from 56% to 66% chlorine, fractionating the resulting mixture of chlorobutanes, and subjecting the chlorobutane fraction boiling between 140° and 160° C. to pyrolysis at a temperature of from approximately 400° to 500° C., whereby a portion of said chlorobutane fraction is converted to monochloro-1,3-butadienes, and isolating the 2-chloro-1,3-butadiene from said product.

3. In the process for preparing 2-chloro-1,3-butadiene, the steps which comprise subjecting a chlorobutane fraction boiling between 140° and 160° C. obtained by direct chlorination of butane to a chlorine content of from 56% to 66%, to pyrolysis at temperatures of approximately 400° to 500°, and isolating from the resulting product the 2-chloro-1,3-butadiene.

4. A continuous process for the manufacture of monochloro-1,3-butadienes from butane, which comprises subjecting butane to direct chlorination until the chlorinated butane mixture contains from 56% to 66% chlorine, fractionating the resulting mixture of chlorobutanes, continuously separating the fraction boiling between approximately 140° and 160° C. while recirculating the lower boiling butane and chlorobutanes to the chlorinating zone, subjecting the chlorobutane fraction boiling between 140° and 160° C. to pyrolysis at temperatures of from approximately 400° to 500° C., and continuously isolating from the resulting pyrolysis product the 2-chloro-1,3-butadiene.

ALBERT S. CARTER.
FRANK WILLARD JOHNSON.